United States Patent [19]
Shaw

[11] Patent Number: 5,497,067
[45] Date of Patent: Mar. 5, 1996

[54] BATTERY CHARGER WITH TIMER-CONTROLLED CHARGING, SHUT-OFF AND RESET OPERATIONS

[76] Inventor: Donald E. Shaw, 9206 Peppertree Cir., Wichita, Kans. 67226

[21] Appl. No.: 198,468

[22] Filed: Feb. 18, 1994

[51] Int. Cl.$^6$ ........................................... H02J 7/02
[52] U.S. Cl. ................................ 320/21; 320/38
[58] Field of Search .................. 320/21, 37, 38, 320/20

[56] References Cited

U.S. PATENT DOCUMENTS

| | | | |
|---|---|---|---|
| 2,436,057 | 2/1948 | Pugh | 320/20 |
| 2,456,978 | 12/1948 | Medlar | 320/14 |
| 2,977,525 | 3/1961 | Medlar | 320/19 |
| 3,603,861 | 9/1971 | Staats et al | 320/14 |
| 3,867,681 | 2/1975 | Bishop et al. | 320/21 |
| 3,886,427 | 5/1975 | Long | 320/37 X |
| 3,921,050 | 11/1975 | Rowas | 320/19 |
| 4,016,474 | 4/1977 | Mason | 320/38 X |
| 4,035,709 | 7/1977 | Seider et al. | 320/37 X |
| 4,499,415 | 2/1985 | Itoh | 320/5 |
| 4,568,869 | 2/1986 | Graham, Jr. | 320/20 |
| 4,575,670 | 3/1986 | Hignutt | 320/14 |

FOREIGN PATENT DOCUMENTS

| | | | |
|---|---|---|---|
| 493367 | 6/1953 | Canada | 320/24 |
| 536077 | 1/1957 | Canada | 320/17 |
| 2246737 | 10/1990 | Japan | 320/21 |

Primary Examiner—Peter S. Wong
Assistant Examiner—Robert E. Nappi
Attorney, Agent, or Firm—John R. Flanagan

[57] ABSTRACT

A timer control circuit is coupled with a battery charger to control on a timed basis the charging, shut-off and reset operations of the battery charger. The timer control circuit includes a timer, a d.c. power supply connected to the timer, and an auxiliary relay connected to the timer and connected between a battery and the battery charger. The timer is operable to repetitively and automatically turn on for a first preset timing period, turn off for a second preset timing period, and then turn on again for the first preset timing period. During each second preset timing period, when the timer is turned off, the auxiliary relay is normally deactuated so as to open a feedback path from the battery to the battery charger permitting the battery charger to reset in preparation for initiating a new charging cycle. Then, during each first preset timing period, when the timer is turned on, the auxiliary relay is actuated so as to close the feedback path causing the battery charger to initiate the new charging cycle.

3 Claims, 1 Drawing Sheet

BATTERY CHARGER WITH TIMER-CONTROLLED CHARGING, SHUT-OFF AND RESET OPERATIONS

BACKGROUND OF THE INVENTION

1. Field of the Invention

The present invention generally relates to charging of batteries and, more particularly, is concerned with an improved battery charger with timer-controlled charging, shut-off and reset operations.

2. Description of the Prior Art

Equipment, such as electric golf carts and the like, are typically placed in storage for extended periods of time, such as during offseason, when not in use. A battery provided on an electric golf cart will deteriorate significantly in its ability to hold charge if not kept at full charge while in storage and not being used. Such deterioration can lead to shortening of the useful life of the battery.

In order to avoid the aforementioned adverse affects, a widespread conventional practice is to provide a battery charger on the electric golf cart which is semi-automatic in that it will charge the battery, sense the charge condition of the battery, and then turn itself off when fully charged. Typically, such semi-automatic battery charger has a charging circuit, a pair of lead wires for connection to the respective positive and negative terminals of the battery, a control circuit, and a main relay having a switch portion and an actuator portion. The switch portion of the main relay is connected between the source of electrical power and the charging circuit. The actuator portion of the main relay is connected between ground potential and the output of the control circuit. The input of the control circuit is connected to the hot or positive terminal of the battery via one of the respective lead wires of the charger. The switch of the main relay normally assumes an open circuit condition when the lead wires are not connected to the battery terminals. Upon connecting the lead wires to the battery terminals, the actuator portion of the main relay is supplied with electrical power from the battery and causes the switch portion thereof to change from the open circuit condition to a closed circuit condition permitting electrical power to flow to the charging circuit of the charger from the power source.

The control circuit of the battery charger has a sensor which detects the magnitude of the voltage across the battery terminals. As the charging circuit operates to charge the battery, the magnitude of the voltage across the battery terminals is fed back to and detected by the sensor in the control circuit so that a determination can be made as to how much charge is still needed for the battery. When the feedback voltage is of sufficient magnitude to indicate to the control circuit that the battery is fully charged, the control circuit will then terminate operation of the charging circuit and thus charging of the battery by the charger by cutting off electrical power to the main relay. Once charging is so terminated and the battery charger is, in effect, shut or turned off, the charger cannot be turned on again until after the control circuit is reset which can only occur by disconnecting the lead wires from the battery terminals or interrupting the feedback voltage.

A drawback of this semi-automatic mode of operation of a typical conventional battery charger is that a person has to be available to monitor the charging operation in order to initiate a subsequent charging cycle. The person has to physically disconnect and reconnect the lead wires of the charger from and to the battery terminals or to interrupt the feedback voltage from the battery to the charger control circuit in some manner in order to cause resetting of the charger control circuit which will thereafter permit the charger to initate another charging cycle.

Consequently, a need still exists for improvement of the semi-automatic battery charger so as to achieve periodic unattended recharging of a battery and thereby overcome the drawback of the prior art.

SUMMARY OF THE INVENTION

The present invention provides a battery charger with timer-controlled charging, shut-off and reset operations designed to satisfy the aforementioned need. In accordance with the present invention, the battery charger is made fully automatic in its operation by incorporating a timer control circuit. By adding the timer control circuit of the present invention to the battery charger, the user is allowed to maintain the battery in a fully charged condition over a long period through performance of a series of unattended periodic rechargings.

The timer control circuit is set up to start a charging cycle by simulating the disconnection and reconnection of the battery from and to the control circuit of the charger so that the control circuit can reset and a new charging cycle may be initiated and the battery recharged to a fully charged condition. When the full charge is sensed by its control circuit, the charger will automatically shut off and wait to be reset by the timer control circuit at the end of the preset timing period. This sequence will be repeated until the electrical power to the battery charger is disconnected or the charger is switched from the aforementioned automatic mode of operation to a normal non-automatic mode of operation.

Accordingly, the present invention is directed to a timer control circuit for coupling to a battery charger to control on a timed basis a sequence of charging, shut-off and reset operations of the battery charger. The timer control circuit comprises: (a) a timer preset so as to repetitively and automatically turn on for a first preset timing period, turn off for a second preset timing period, and then turn on again for the first preset timing period; (b) a power source connected to the timer; and (c) switch means connected to the timer and connectable in a feedback circuit path between a battery and the battery charger such that during each second preset timing period, when the timer is turned off, the switch means is normally deactuated so as to open the feedback circuit path permitting the battery charger to reset in preparation for initiating a new charging cycle, whereas during each first preset timing period, when the timer is turned on, the switch means is actuated so as to close the feedback path causing the battery charger to initiate the new charging cycle.

More particularly, the switch means is an auxiliary relay. The auxiliary relay has an actuator portion and a switch portion. The actuator portion is connected to the timer. The switch portion is connectable in the feedback circuit between the battery and battery charger. The power source includes a d.c. power supply and a power control device connectable to the feedback circuit path and connected between the d.c. power supply and timer to prevent operation of the timer by the d.c. power supply when the battery is disconnected from the feedback circuit path.

The battery charger includes a charging circuit connected to a battery, a control circuit and a main relay connected between the control circuit and charging circuit. The main relay is operable to close a circuit path from a source of electrical power to the charging circuit in response to actuation by the control circuit and to open the circuit path in response to deactuation by the control circuit when the battery is fully charged.

The auxiliary relay of the timer control circuit connected to the timer is connected between the control circuit and battery. During each second preset timing period, when the timer is turned off, the actuator portion of the auxiliary relay is normally deactuated so as to open the switch portion thereof and thereby open the feedback circuit path permitting the control circuit of the battery charger to reset in preparation for initiating a new charging cycle. Then, during each first preset timing period, when the timer is turned on, the actuator portion of the auxiliary relay is actuated so as to close the switch portion thereof and thereby close the feedback path causing the control circuit of the battery charger to initiate the new charging cycle.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

In General

Figure 1:
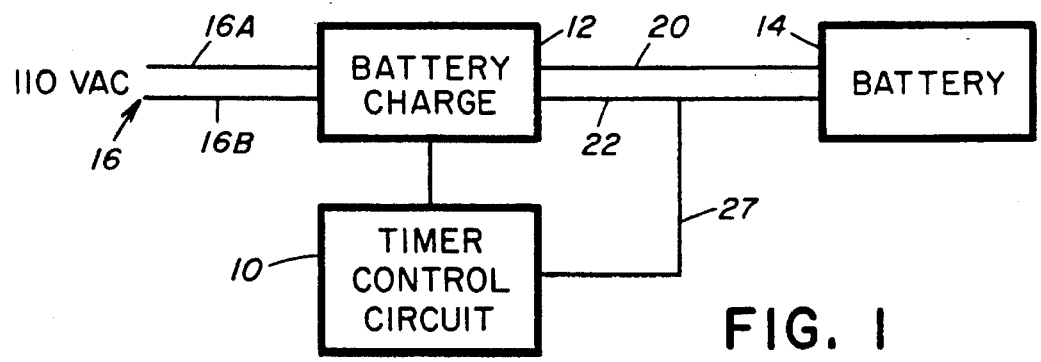
FIG. 1 is a block diagram of a timer control circuit of the present invention associated with a conventional battery charger and battery.

Referring to the drawings, and particularly to FIG. 1, there is illustrated a timer control circuit, generally designated 10, of the present invention, connected to a prior art semi-automatic battery charger 12 which, in turn, is connected to a d.c. battery 14, such as employed on the electric golf cart (not shown). The battery charger 12 has an electrical power cord 16, with ground and hot conductors 16A, 16B and a plug 16C, for plugging into an electrical outlet (not shown) to supply standard utility line 110 VAC electrical power to the battery charger 12.

Semi-Automatic Battery Charger

Figure 2:
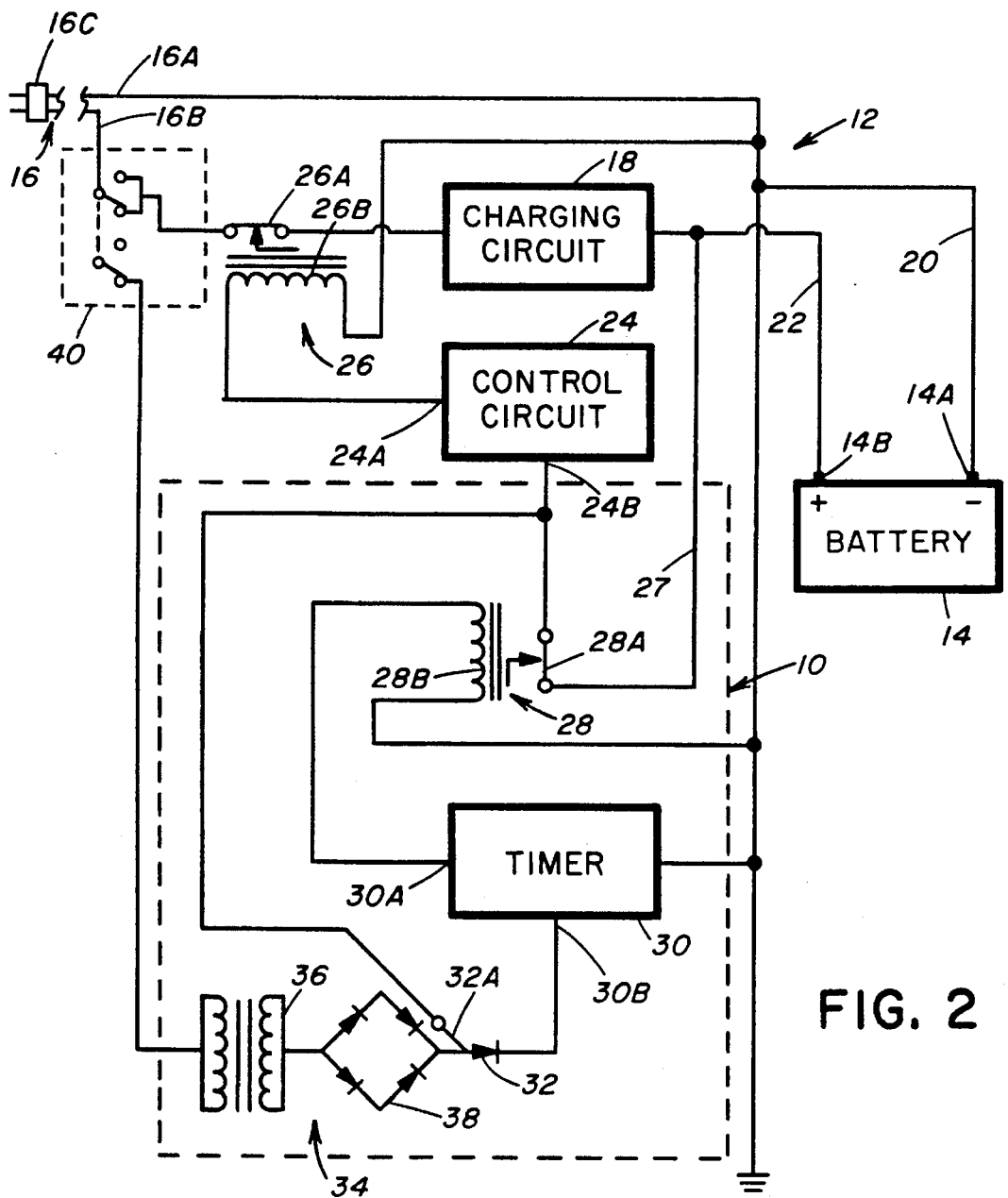
FIG. 2 is a detailed diagram of the timer control circuit of the present invention.

As is well-known, the prior art battery charger 12 is basically adapted to charge the battery 14, sense the charge condition of the battery 14, and then turn itself off. Referring to FIG. 2, the prior art battery charger 12 basically includes a charging circuit 18, a pair of ground lead and hot lead wires 20, 22 electrically connectable respectively to the negative and positive terminals 14A, 14B of the battery 14, a control circuit 24, and a main relay 26.

The main relay 26 has an off/on switch portion 26A and an actuator portion 26B operable in a conventional well-known manner to move the switch portion 26A between "off" and "on" positions. The switch portion 26A of the main relay 26 is electrically connected between the charging circuit 18 and the hot conductor 16B of the power cord 16. The switch portion 26A of the main relay 26 normally assumes an open circuit condition that prevents the flow of electrical power to the charging circuit 18 of the charger 12 from the 110 VAC power source via the power cord 16. The actuator portion 26B of the main relay 26 is electrically connected between the output 24A of the control circuit 24 and ground potential G. The input 24B of the control circuit 24 is electrically connected to the positive terminal 14B of the battery 14 via the respective hot lead wire 22 so as to define a path 27 for feedback of battery voltage to the control circuit 24. No feedback of battery voltage occurs when the lead wires 20, 22 are not connected to the battery terminals 14A, 14B.

The control circuit 24 will automatically reset once it is disconnected from the battery 14. Once the control circuit 24 has reset and the lead wires 20, 22 of the charger 12 are connected to the battery terminals 14A, 14B, the actuator portion 26B of the main relay 26 is supplied with electrical power from the battery 14 through the control circuit 24. The supply of electrical power from the battery 14 to the actuator portion 26B of the main relay 26 causes it to move in a well-known manner and actuate the switch portion 26B thereof from the open circuit condition to a closed circuit condition. Upon plugging of the plug 16C of the power cord 16 into an electrical utility power outlet (not shown), the closed switch portion 26B of the main relay 26 permits electrical power to flow to the charging circuit 18 of the charger 12 from the 110 VAC power source via the power cord 16. The charging circuit 18 then operates so as to start a charging cycle to charge the battery 14.

The control circuit 24 of the battery charger 12 has a sensor (not shown) which detects the magnitude of the voltage present across the battery terminals 14A, 14B. As the charging circuit 18 operates to charge the battery 14, the magnitude of the voltage across the battery terminals 14A, 14B is fed back through the abovementioned feedback path 27 to the sensor in the control circuit 24 so that a determination can be made by the control circuit 24 as to the charge condition of the battery 14. When the feedback voltage is of sufficient magnitude to indicate to the control circuit 24 that the battery 14 is now fully charged, the control circuit 24 then terminates operation of the charging circuit 18 and thus terminates charging of the battery 14 by the charger 12 by cutting off electrical power to the actuator portion 26B of the main relay 26 which, in turn, causes the actuator portion 26B to move in reverse and return the switch portion 26A to its normal open circuit condition. Once charging is so terminated and the battery charger 12 is, in effect, turned off, the charger 12 cannot be turned back on again until after the control circuit 24 is allowed to reset which can only occur after either disconnecting the lead wires 20, 22 from the battery terminals 14A, 14B or interrupting the feedback voltage to the control circuit 24.

The timer control circuit 10 of the present invention, as described below, is provided to simulate the necessary disconnection and reconnection of the battery charger 12 from and to the battery 14 for a sufficient time to permit resetting of the control circuit 24 of the charger 12. Thus, the timer control circuit 10 improves the prior art battery charger 12 by fully automating the operation thereof.

Timer Control Circuit

Referring again to FIG. 2, there is illustrated the detailed construction of the timer control circuit 10 of the present invention. The timer control circuit 10 basically includes an auxiliary relay 28, a timer 30, a power control switch 32, and a d.c. power supply 34. The auxiliary relay 28 has an off/on switch portion 28A and an actuator between deactuated and actuated conditions portion 28B operable in a conventional well-known manner to move the switch portion 28A between "off" and "on" positions. The switch portion 28A of the auxiliary relay 28 is electrically connected between the input 24B of the control circuit 24 of the battery charger 12 and the hot lead wire 22 connecting the battery charger 12 to the positive terminal 14B of the battery 14. The switch portion 28A normally assumes an open condition in which it interrupts and opens the feedback path 27 between the battery 14 and input 24B of the control circuit 24. The actuator portion 28B of the auxiliary relay 28 is electrically connected between the output 30A of the timer 30 and ground potential G.

The timer 30 is electrically connected between the power control switch 32 and the actuator portion 28B of the auxiliary relay 28. The timer 30 can be any commercially available device having an adjustable RC oscillation cycle for presetting the number of timing counts produced by and thus the "on" and "off" timing periods of the timer 30. The power control switch 32 is electrically connected between the input 30B of the timer 30 and the d.c. power supply 34. The power control switch 32 is a silicon controlled rectifier (SCR) device 32 having its control gate 32A connected in the feedback path 27 between the input 24B of the control circuit 24 and the switch portion 28A of the auxiliary relay 28.

Thus, when the switch portion 28A of the auxiliary relay 28 is in the closed circuit condition, sufficient voltage is supplied from the battery 14 to the control gate of the SCR device 32 to turn the device on and conduct d.c. electrical power to cause the timer 30 to initiate a first preset timing period. The d.c. power supply 34 basically includes a stepdown voltage transformer 36 and a diode rectifier bridge 38 for changing a.c. to d.c. to operate the timer 30 when the SCR device 32 is turned on.

The timer control circuit 10 through its timer 30 operates in an astable mode. With the application of electrical power to the timer 30, the timer 30 turns on and the first preset timing cycle or period, defined by a preset number of counts, such as 128, times the RC oscillation cycle of the timer 30, is produced at the output of the timer 30. The first preset timing period selected typically will fall within a range of from about 120 to 150 hours, or approximately from 5 to 6 days. The timer 30 also functions to turn off for a second preset timing cycle or period which is much shorter than the first preset timing period. The second preset timing period only needs to be long enough to permit the control circuit 24 of the battery charger 12 to reset.

The output 30A of the timer 30 goes to a high state at the start of the first preset timing period and actuates the actuator portion 28B of the auxiliary relay 28 to change the switch portion 28A thereof from a normally open circuit condition in which the feedback circuit path 27 is interrupted between the battery terminal 14B and the input 24B of the control circuit 24 to a closed circuit condition in which the charger feedback path 27 is closed between the battery terminal 14B and the input 24B of the control circuit 24. Closing of the feedback path 27 will cause the control circuit 24 to actuate the actuator portion 26B of the main relay 26 and close the switch portion 26A thereof, causing the charging circuit 18 to begin to recharge the battery 14. As described above, when the feedback voltage is of sufficient magnitude to indicate to the control circuit 24 that the battery 14 is again fully charged, the control circuit 24 then terminates operation of the charging circuit 18 and thus terminates charging of the battery 14 by the charger 12 by cutting off electrical power to the actuator portion 26B of the main relay 26 which, in turn, causes the actuator portion 26B to allow the switch portion 26A to return to its normal open circuit condition. Once charging is so terminated and the battery charger 12 is, in effect, turned off, the charger 12 cannot be turned back on again until after the control circuit 24 is allowed to reset. This only occurs at the end of the first preset timing period of the timer 30 when it goes back to a low state.

After the output of the timer 30 has been at the high state for the first preset timing cycle or period, it automatically returns to the low state for the second preset timing period and deactuates the actuator portion 28B of the auxiliary relay 28 to permit the switch portion 28A thereof to return to its normally open circuit condition and thereby open the feedback circuit path 27 from the battery 14 to the input 24B of the control circuit 24. Thus, during the second preset timing period, the switch portion 28B of the auxiliary relay 28 disconnects the control circuit 24 from the battery 12 allowing the control circuit 24 to reset to be ready to begin a new charging cycle.

The control gate 32A of the power control device 32 will also receive power from the battery 14 through the closed feedback circuit path 27, turning on the power control device 32 to conduct sufficient power from the power supply 34 to the input 30B of the tiger 30 to start another timing cycle or period at the end of which the charging circuit 18 is shut off. This will run continuously until the plug 16C of the power cord 16 is disconnected, the charger 12 is switched from the above-described timed recharge mode of operation to a normal mode of operation by flipping a single-pole-double-throw (SPDT) switch 40, or the battery 14 is disconnected from the charger 12. The battery 14 must be connected to the charger 12 and the timer control circuit 10 for the timed recharge mode of operation to work. The control gate 32A is connected to the battery 14 so that power from the battery 14 will be present to allow the timing cycle to begin.

Thus, the timer control circuit 10 is set up to start a charging cycle and keep the electrical power applied to the control circuit 24 of the charger 12 for the first preset period of time. The first preset period of time is selected to be of a substantially longer duration than the maximum length of time that the charger 12 would take to fully charge the battery 14. This relationship allows sufficient time for the battery 14 to have lost some of its charge before the next charging cycle is initiated.

After expiration of this first preset timing period, the timer control circuit 10 interrupts the connection between the battery 14 and the charger control circuit 24 so that a new charging cycle may be initiated. In particular, the timer 30 causes the auxiliary relay 28 of the timer control circuit 10 to simulate the removal of the lead wires 20, 22 of the charger 12 from the battery 14 so that the control circuit 24 of the charger 12 will reset and initiate another charging cycle. The first timing cycle of the timer 30 is then restarted and the battery 14 is recharged to a fully charged condition. When the full charge is sensed by its control circuit 24, the charger 12 will automatically shut off and wait to be reset by the timer control circuit 10 at the end of the first preset timing period. This sequence will be repeated until the electrical power to the battery charger 12 is disconnected or the charger 12 is switched from the aforementioned automatic timed recharge mode of operation to the normal non-automatic single charge mode of operation.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. In combination with a battery charger having a charging circuit connect ed to a battery to be charged and adapted to operate to charge the battery, a control circuit having an input connected in a feedback circuit path with the battery and being adapted to sense the charge condition of the battery and to reset in response to sensing opening of said feedback circuit path with the battery, and a main relay connected between said charging circuit and an output of said control circuit and being operable to close a circuit path to said charging circuit to initiate operation of said charging circuit to charge the battery in response to actuation of said main relay by said control circuit as a result of said reset of said control circuit and to open said circuit path to terminate operation of said charging circuit to charge the battery in response to deactuation of said main relay by said control circuit as a result of said control circuit sensing the battery reaching a full charge, a timer control circuit which controls on a timed basis a sequence of charging, shut-off and reset operations of said battery charger, said timer control circuit comprising:

(a) a timer preset to operate to repetitively and automatically turn on for a first preset timing period selected to be of a substantially longer duration than a maximum length of time that said charging circuit of said battery charger would take to fully charge the battery and to allow sufficient time for the battery to partially discharge before another charging of the battery is initiated, turn off for a second preset timing period selected to be of a substantially shorter duration than said maximum length of time that said charging circuit of said battery charger would take to fully charge the battery but of a longer duration than a period of time needed by said control circuit of said battery charger to reset, and then turn on again for said first preset timing period;

(b) an electrical power source connected to said timer; and (c) an auxiliary relay having an actuator portion and a switch portion, said actuator portion of said auxiliary relay being connected to said timer and actuated by said timer at the start of said first preset timing period and deactuated by said timer at the start of said second preset timing period, said switch portion of said auxiliary relay normally assuming an open condition when said actuator portion of said auxiliary relay is deactuated by said timer and being movable by said actuator portion of said auxiliary relay to a closed condition in response to actuation of said actuator portion of said auxiliary relay by said timer, said switch portion of said auxiliary relay being connected in said feedback circuit path between the battery and said input of said control circuit of said battery charger such that upon initiation of each said second preset timing period, when said timer turns off, said actuator portion of said auxiliary relay is deactuated in response to said timer turning off so as to permit said switch portion of said auxiliary relay to open said feedback circuit path and thereby disconnect the battery from said input of said control circuit of said battery charger permitting said control circuit of said battery charger to reset in preparation for said control circuit of said battery charger to actuate said main relay and thereby initiate another charging of the battery by said charging circuit of said battery charger, whereas upon initiation of each said first preset timing period, when said timer turns on, said actuator portion of said auxiliary relay is actuated in response to said timer turning on so as to cause said switch portion of said auxiliary relay to close said feedback circuit path to said input of said control circuit of said battery charger causing said control circuit of said battery charger to actuate said main relay and thereby initiate another charging of the battery by said charging circuit of said battery charger.

2. The timer control circuit of claim 1 wherein said power source includes a d.c. power supply.

3. The timer control circuit of claim 2 wherein said power source further includes a silicon controlled rectifer connectable to said feedback circuit and connected between said d.c. power supply and said timer for preventing operation of said timer by said d.c. power supply when the battery is disconnected from said feedback circuit.

* * * * *